United States Patent [19]

Mayhew

[11] Patent Number: 4,621,323

[45] Date of Patent: Nov. 4, 1986

[54] MESSAGE TRANSMISSION CIRCUITRY

[75] Inventor: Steven C. Mayhew, Nashua, N.H.

[73] Assignee: Digital Equipment Corporation, Maynard, Mass.

[21] Appl. No.: 479,634

[22] Filed: Mar. 28, 1983

[51] Int. Cl.⁴ .............................................. G06F 11/14
[52] U.S. Cl. ....................................... 364/200; 371/32
[58] Field of Search ............................. 371/31, 32, 49; 364/200 MS File, 900 MS File

[56] References Cited

U.S. PATENT DOCUMENTS 3,824,547  7/1974  Green et al. ............................ 371/32
3,979,719  9/1976  Tooley et al. .......................... 371/32

Primary Examiner—Thomas M. Heckler
Attorney, Agent, or Firm—William E. Cleaver

[57] ABSTRACT

The present invention provides parity error detection circuitry to effect an automatic second transmission of the data information signals in the event that a first transmission of said data information signals is determined to have a parity error. The invention includes a latch register through which data information signals are transmitted from a slave device to a master device and, there is also included parity check circuitry. When a parity error occurs in the transmission of data information signals, a parity error signal is generated by the master device which ultimately causes the latch register to hold the information which was previously transmitted as data signals and which data signals gave rise to the parity error. Accordingly a second set of data signals can be transmitted from the latch register, in an attempt to get a transmission of said data signals without error. The system also provides for detecting a parity error resulting from an irregular transmission of address information signals and such parity error gives rise to a parity error signal which acts in conjunction with logic circuitry to provide for a "retry" of the whole operation including a second transmission of the address signals and the data signals.

9 Claims, 2 Drawing Figures 4,621,323

MESSAGE TRANSMISSION CIRCUITRY

BACKGROUND

In the art of data communications, bit signals are transmitted in serial fashion or in parallel fashion, along transmission lines, at very high speeds, and at relatively low voltage amplitudes, all of which characteristics give rise to the occasional losing of one or more bit signals. Noise factors also enter the picture and provide a basis for bit signal loss. In systems where the interface cards are changed by the user, while the system is operating, there often occurs the losing of bit signals because the card swap so often gives rise to signal transients. For all of the foregoing and for other reasons it has been necessary, in data communications systems, to do parity checks as information signals are transmitted from one point in the system to another point in the system.

In prior art data communication systems there is a provision by which the programmer can program the data processor, used in the data communication systems, to be alerted by a parity error signal and to use that alert signal to resend the message or to request that a message be resent. Such an arrangement is useful but it does require that memory space be allocated for the program information necessary to effect such a routine and it has required that either whole messages be resent or portions of messages between flags be resent both of which procedures are costly in time.

The present system adopts the philosophy that an irregularity, in data (or address) information transmission, is merely a temporary condition and that a retransmission of that same data (or address) information is likely to be correct. Accordingly the present system provides circuitry and hardware to automatically effect a "retry" when the transmission of data (or address) information signals has been determined to be incorrect.

SUMMARY

The present system works in conjunction with a signal bus which: has lines therein dedicated to transmitting data and address information signals; has lines therein dedicated to transmitting control signals, which control signals condition logic circuits which are connected to the signal bus in order that those logic circuits become operative; and has lines therein dedicated to transmitting supplemental signals to provide proper parity values at the receiving components and has at least one line which is dedicated to carrying a parity error signal when a parity error has been determined. In addition the present system includes a latch register which is coupled to the signal bus to transmit information signals thereto. The latch register accepts data information signals from a USART or some other volatile data source, and transmits said data information signals over the signal bus to the properly addressed component which is connected to the signal bus. If the receiving component detects a parity error it will send a parity error signal to condition certain logic circuitry which in turn will condition the latch register to cause it to be placed in a "hold" condition. In said "hold" condition, the latch circuitry, which provided the data information signals, is held active so that the source of the information signals, in the latch register, is not lost. The information signals are available at the next readout time to automatically effect a subsequent transmission of the same data information signals which were previously sent.

The system further provides for detecting a parity error in the transmission of address information signals. In the event that there is a parity error signal resulting from the transmission of address information signals, the system provides for aborting the associated data information transmissions and the system provides for retrying a transmission of the adress information signals and the data information signals.

The present system also provides for blocking data information signals which would be poised to enter into the latch register if, in fact, the retry is in effect and further provides for aborting any data information signals which may have been sent by the data processor when it is determined that such data information signals have been transmitted in error.

The objects and features of the present invention will be better understood in view of the following description taken in conjunction with the drawings wherein.

Figure 1:
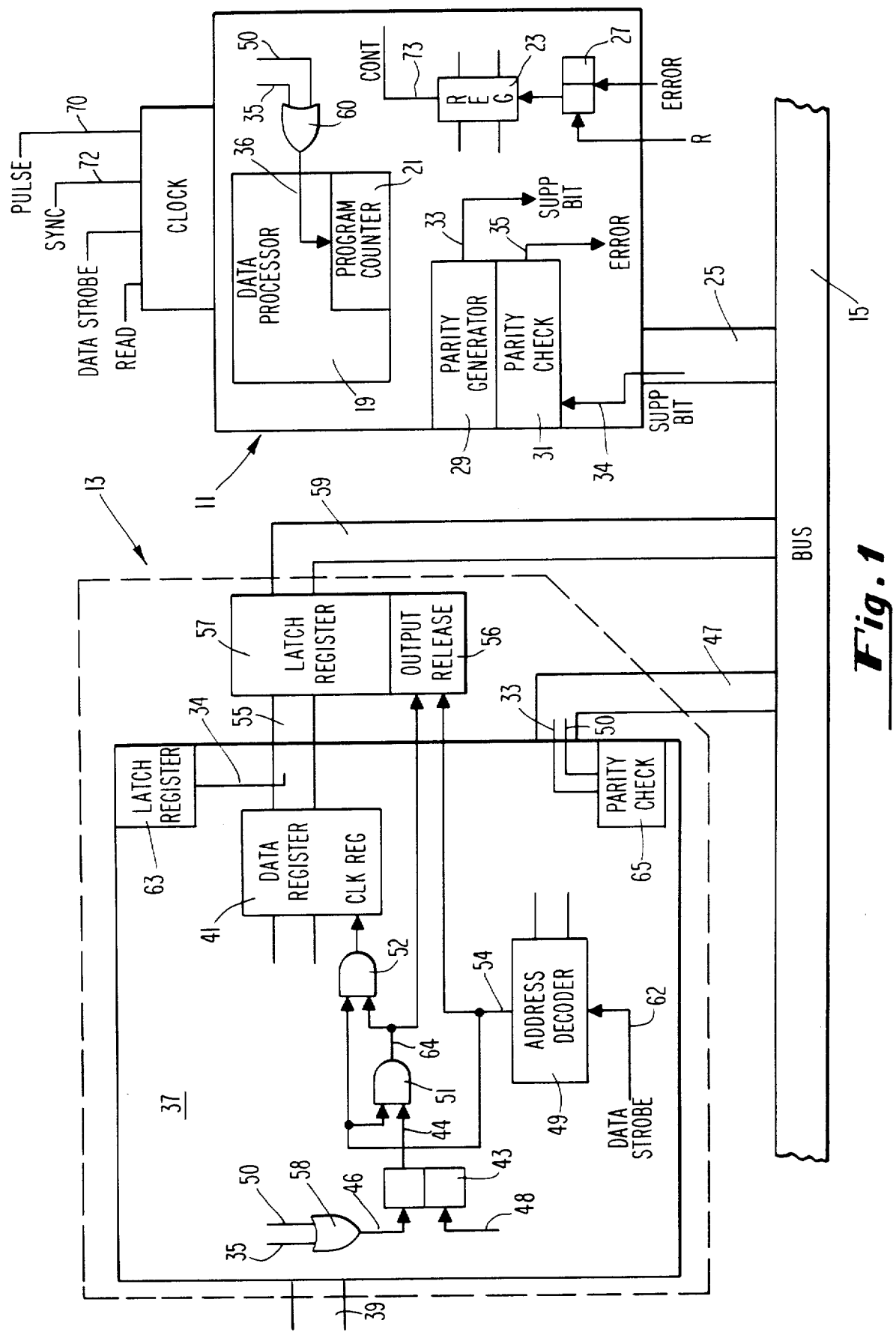
FIG. 1 is a block diagram schematic of a portion of a data communication system including the present invention.
Figure 2:
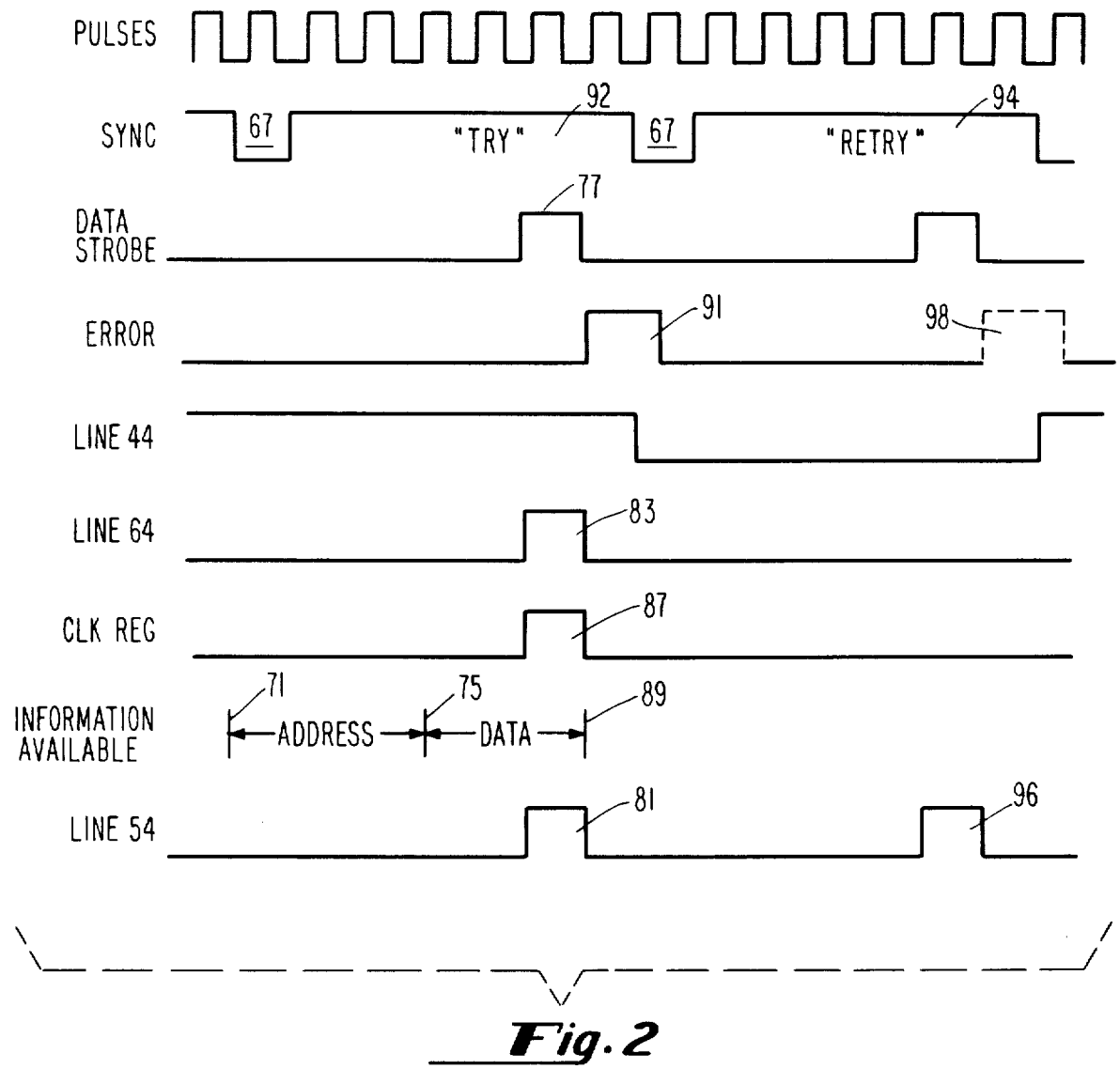
FIG. 2 is a set of timing diagrams of the signals which are present in the described system.

Consider FIG. 1. In FIG. 1 there is shown a master device 11 and a slave device 13. The slave device 13 is outlined in a dashed line. It should be understood that in a data communications system it is likely that there will be many slave devices. Such slave devices will include, for instance, a telecommunications system, that is a system which is connected to a telephone line which in turn is connected to a terminal at some remote location. Such slave devices may include peripherals such as tape handler devices, or disc devices, or word processor devices, all of which may be connected to the bus 15 to provide information to the master device 11. As part of the master device 11 there is shown a clock signal generator 17. The clock signal generator 17 can be any well-known clock generating circuit and for the present invention it need be capable of providing the clock signals entitled "pulse," "sync," "data strobe," and "read" (where a "read" deals with a slave to master transfer as compared with a "write" which deals with a master to slave transter). The foregoing identified clock signals are shown in FIG. 2 and will be discussed in more detail hereinafter. Obviously the clock signal generator 17, generates other forms of clock signals which are used in the data communication system, but which are not described here in connection with the present invention. In the preferred embodiment, the clock signal generator 17 is part of part no. 82S100, manufactured by Signetics Corporation.

In the master device 11 there is shown a data processor 19 which has a program counter 21 as part thereof. The data processor 19 can be any one of the many sophisticated microprocessors, commercially available, and in the preferred embodiment is part no. 82S100 manufactured by Signetic Corporation. As mentioned above, the data processor 19 has a program counter 21 as part thereof and the program counter 21 is advanced, as is well understood in the art, to cause the data processor 19 to go through a series of program steps in a serial fashion. Also shown in the master device 11 is a register 23 which is depicted in order to provide an understanding that data, which is transmitted on the bus 15 and along the lines 25, is received in the master device 11 and in particular in some register therein. Actually register 23 could be part of the data processor 19, or could be a separately provided RAM, to accept such data information signals.

Registers, such as register 23, are well-known and understood in the present state of the art and no further description thereof is deemed to be necessary. As can be gleaned from FIG. 1 there is a flip-flop 27 which is connected to the register 23 to provide a control signal thereto which will be described hereinafter. Further shown in the master device 11 is a parity generator 29 and a parity check circuit 31. The parity generator 29 operates to monitor information signals, which are being transmitted from the master device, such as address information signals, and to provide a supplemental bit signal on line 33, if a supplemental bit signal is necessary to provide the proper parity value at the receiving device. In other words if the parity ground rule is that the parity value should be even and if, in fact, the parity generator circuit counts an odd number of bits being transmitted, then one additional bit will be transmitted on line 33 to provide an even parity value at the receiving device. Parity generators and parity check circuits are well known in the present state of the art and no further description thereof is deemed necessary. In the preferred embodiment the parity generator is a part no. 93S48 manufactured by National Semiconductor Corporation. The parity check circuit 31 acts to monitor the signals being received by the master device and if, in fact, the parity is not even, under the previously suggested ground rule, then a parity error signal will be transmitted on line 35. In the present system in the bus 15 there is a line dedicated to transmitting the supplemental signals such as on line 33. A supplemental bit is provided (when generated) to each of the slave devices. As can be seen in FIG. 1 the supplemental bit is provided on line 34 to the parity check circuit 31. Also in the bus 15 there is a line dedicated to accept parity error signals whether those parity error signals be generated by the master device 11 or by any of the slave devices connected to the bus 15.

In the slave device 13 there is shown a transceiver 37 which accepts information from an interface circuit such as a modem. The signals from the modem are transmitted along the lines 39 to be received by the data register 41 in the transceiver 37. Information signals are held in the data register 41 until that register is conditioned for a readout. The logic circuitry which provides signals to condition the register 41 is connected and operates as described immediately hereinafter.

As can be seen in FIG. 1 there is a flip-flop 43 located in transceiver 37. The flip-flop 43 is normally operating in its reset condition. When flip-flop 43 is in its reset condition it provides a high signal on line 44. It should be understood that flip-flop 43 is a J-K flip-flop and operates such that if there is a signal on line 46 then a signal on line 48, i.e. a high to low transition, will transfer flip-flop 43 to its set side. When flip-flop 43 is operating in its set condition, it provides a low signal on line 44. If on the other hand flip-flop 43 is in its set condition (irrespective of whether or not there is a signal on line 46), a high to low transition signal on line 48 will transfer flip-flop 43 to its reset side. As will become apparent in the discussion of FIG. 2, the signal on line 48 is the "sync" signal and the signal on line 46 is an error signal arising because of a parity error detected from a data transmission or from an address transmission.

In order to understand the connection and operation of the logic circuitry further, assume that there has been no parity error detected and therefore flip-flop 43 is in its reset condition. Accordingly there will be a high signal on line 44 providing a ONE input or a high input, to AND gate 51. Assume further that at this time, or prior thereto, the master device 11 has sent address signals to all of the slave devices, but slave device 13 is the slave device from which the master device wants information. Accordingly when the address signals were received by the address decoder 49, the address decoder decoded the signals and provided a "read register" signal on line 54. Actually in order for the address decoder 49 to provide the "read register" signal on line 54 there must be a data strobe signal present on line 62. The read register (high) signal is transmitted to provide a high signal to each of the AND gates 51 and 52. In addition the "read register" signal is transmitted to provide a high signal to the input of latch register 57 which in turn acts to connect latch register 57 onto the bus 15. When the address signals were transmitted from the master device 11 (along lines 25, along dedicated lines in bus 15, and along lines 47) they were checked by parity checker 65. If there had been a parity error resulting from, or determined as being present in, the transmission of the address signals then the parity check circuit 65 would have generated a parity error signal on line 50. An error signal on line 50 would be transmitted through the OR gate 58 to provide an error signal on line 46. An error signal on line 46 would condition flip-flop 43 to be "set" as explained earlier. In the present example however, it has been assumed that no error signal is present and therefore there is a high signal on line 44 as one input to AND gate 51.

Returning to the discussion of the "read register" signal on line 54, we find that in accordance with the high signal on line 54, AND gate 51 is fully conditioned to provide a high output signal on line 64. The high output signal on line 64 acts to fully condition AND gate 52 (the other high input signal being on line 54) to provide a high input signal to the CLK REG terminal of data register 41. In response to the CLK REG signal, data information signals are transferred from the data register 43 to the latch register 57. If we examine the control input signals to the latch register 57, we find that they are both in a high signal condition. Hence the latch 57 is selected or enabled to transmit signals onto bus 15 and is "transparent", that is the data signals pass from lines 55 to lines 59 and on to the master device which has made the request for the information. As the information signals are transmitted from the data register 41 there is a parity evaluation made by the parity generator 63 and if a supplemental bit is required it is transmitted on line 34 to the parity check circuit 31 located in the master device 11.

Let us assume a second scenario, i.e., where the address information signals are detected to have an error by the parity check circuit 65. In response to the parity error there will be an error signal transmitted on line 50 to both the OR gates 58 and 60. The error signal on line 50 passes through the OR gate 58 to provide an error signal on line 46. The error signal on line 46 conditions the flip-flop 43 to be set when the "sync" signal on line 48 goes through a high to low transition. As explained earlier when flip-flop 43 is in its set condition, a low signal will be present on line 44 and hence a low signal will be present at AND gate 52 and output release gate 56. It follows that during the succeeding cycle no data will be clocked out from the data register 41 and the data in the latch 57 register will be "held" because the output release gate is not fully conditioned. At the same time the error signal on line 50 to OR gate 60 will impede the program counter from advancing and the system will repeat or "retry" the step. If on the "retry" the address information signals do not provide the basis for a parity error then the system will operate as described above under a no error condition.

A third scenario should be considered namely that of an error being created by a data transmission. Initially the data information signals are transmitted under conditions wherein the system assumes no error present. During the first cycle, or the "try" cycle, the data information signals are checked for parity value by the parity check circuit 31. If there is a parity error it is transmitted on line 35 to both of the OR gates 58 and 60, as well as to the flip-flop 27. The error signal on line 35 passes through the OR gate 58 to provide the error signal on line 46. Accordingly at the end of the cycle, end of "sync" gate, flip-flop 43 will be transferred to its set side. As explained earlier, when flip-flop 43 is in its set condition there will be a low signal on line 44 and hence the AND gate 51 will not be fully conditioned. Accordingly the signal on line 64 will be low to impede the AND gate 52 and the output release gate 56. As was explained with respect to the error rising from the address informations signal transmission, there will be no clocking of data so that the data which was transmitted and gave rise to the error is held in the latch 57. The latch register 57 is a commerically available device and in the preferred embodiment is part no. 74L5373 manufactured by Texas Instruments Corp. The error signal, to flip-flop 27, toggles that flip-flop, which provides a control signal to register 23 to abort data information received during the "try" cycle.

It should be understood that the signals being transmitted on the lines 39 are transmitted at a relatively slow rate because the modem or the serial to parallel translator, which is providing the data signals on line 39, must assemble those signals which takes time. Accordingly data information signals can be held in the data register 41 "for a finite amount of time" to avoid destruction or garbling of incoming information from the lines 39 or vice versa.

An examinition of FIG. 2 will provide an appreciation of the timing of the signals which operate the logic just described. In FIG. 2 there is shown a series of pulses which are provided on clock line 70. Below the graphic display of the pulses in FIG. 2 there is shown the sync gate signals and these gate signals are provided on line 72 of the clock generator in FIG. 1. As can be seen in FIG. 2, there are six clock pulses within the sync gate. The time period 67, which is between the end of one sync gate and the following sync gate is considred the dead time. As can be gleaned from FIG. 2, the address information signals from the master device are available as steady state signals from time 71 to time 75. Accordingly, before the data strobe pulse 77 is generated, the address decoder 49 has decoded the address information signals (i.e., made a decision that slave device 13 is the slave device being addressed) and is awaiting a data strobe pulse to provide the "read register" signal 81 on line 54. As can be further seen in FIG. 2, the signal on line 44 is high at the time that "read register" signal 81 is generated and hence the output (line 64) of AND gate 51 goes high to provide pulse 83. Pulse 83 is present at AND gate 52 along with pulse 81 and hence the output (CLK REG) pulse 87 is generated to clock the data informtion signals to data register 41. As can be seen in FIG. 2, the data information signals are present to be clocked into data register 41 from time 75 to time 89.

At the same time as the CLK REG signal 87 is present, there are present at the output release gate 56, both the signals 83 and 81. Accordingly the latch 57 is a transparent latch and the data signals pass from lines 55 to lines 59, along the dedicated lines of bus 15, along lines 25 to the master device 11. As explained earlier the data signals are checked for parity at the parity check circuit 31. Assume that a parity error is detected and a parity error signal is transmitted on line 35. Timewise, as can be seen in FIG. 2, the error signal is signal 91. It will be recalled that if signal 91 is present (on line 46 of FIG. 1) when the sync signal 92 experiences a high to low transition then flip-flop 43 is transferred to its set condition and the signal on line 44 goes low. Notice in FIG. 2 that at the trailing edge of sync gate 92, the line 44 signal goes low.

As can be seen in FIG. 2, with the signal on line 44 low there is no pulse on line 64 and the CLK REG line. Hence no data is clocked into the data register 41 during the "retry" cycle. The "retry" cycle is identified in FIG. 2 by sync gate 94. Since there is no pulse on line 64 during the retry cycle, the latch register 57 holds the information from the previous cycle and makes a second data signal transmission available during the retry cycle. The pulse 96 which is present during the retry cycle is ineffective because the signal on line 44 is low as can be seen in FIG. 2.

An error signal 98 is shown in dashed line in FIG. 2. The error signal 98 may or may not occur, but it is shown to graphically indicate that irrespective of whether or not an error signal is present, when sync signal 44 goes through a high to low transition, the flip-flop 43 will be transferred from its set condition to its reset condition, as described above. Note that the signal on line 44, in FIG. 2, goes from low to high at the trailing edge of sync signal 94.

The present invention provides the circuitry and hardware for an automatic "retry" operation. It eliminates the need for the programmer to program a "retry" and use up memory space in accordance with such a program, and since the system operates at such a high frequency compared to the incoming data on the lines 39, the "retry" can be accomplished without any slowing down of the systems operation.

What is claimed:

1. A slave circuit to be used in a data communications system which as an interconnecting bus means between a master device and said slave circuit, comprising in combination:

address decoder means connected to said interconnecting bus for responding to particular address signals therefrom to provide activating signals;

data signal storage means connected to said interconnecting bus and connected to receive data signals from said data communication system and designed to hold said data signals for subsequent transmission on said interconnecting bus;

logic circuitry means connected to both said data signal storage means and said address decoder means;

control signal circuitry connected to said logic circuitry means to provide at least first and second control signals thereto whereby in response to said first control signal and said activating signals said logic circuitry will cause said data signal storage means to transmit data signals during a first time period and whereby in response to said second control signal and said activating signals said logic circuitry means will cause said data signal storage means to retain data signals, which were the basis of a data transmission in said first time period to be the basis for a data transmission during a subsequent time period.

2. A slave circuit according to claim 1 wherein said data signal storage means includes a data register means connected to receive data signals from a source and includes a latch register means connected to receive data signals from said data register, said latch register means further designed to hold data signals for a second transmission in response to the generation of said second control signal, and wherein said latch register means transmits data signals on said bus.

3. A slave circuit according to claim 2 wherein said data register includes responsive means to cause data signals to be clocked into said data register in response to the provision of said first control signal and to cause data signals to be inhibited from entering said data register in response to the provision of said second control signal.

4. A slave circuit according to claim 1 wherein said control signal circuit includes a bistable circuit having first and second input means and operable in first and second conditions, said bistable circuit for providing said first control signal in response to said bistable circuit operating in its first condition at the time that a clock signal is present on said second input means and further for providing said second control signal in response to said bistable circuit operating in its second condition in response to a particular signal on said first input means and said clock signal on said second input means.

5. In a data communications system which includes a data signal source and transmits data signals and address signals between at least one master device and at least one slave device and wherein said master device has a data processing means with a program advance means as well as a clock signal generator, as parts thereof, which clock signal generator provides a plurality of different clock signals, a circuit to enable said master device to undertake a subsequent step of obtaining data signals from a slave device when an irregularity has been detected in data signals transferred in a prior step, comprising in combination: signal bus means connecting said slave device with said master device; addressable data signal storage means connected as part of said slave device, said addressable data signal storage means connected to a data signal source to receive data signals therefrom and connected to said signal bus to receive address signals from said master device to condition said slave device to transmit data signals therefrom; latch register means, connected to said addressable data signal storage means to receive control signals and data information signals therefrom and connected to said signal bus means to transmit data signals therealong to said master device, said latch register means further designed to respond to control signals to retain data signals, which represent data signals previously transmitted to said master device; first and second parity circuits respectively connected as part of said master device and said slave device, said first and second parity circuits formed to provide supplemental signals to maintain correct parity for groups of information signals respectively transmitted by said master device and said slave device for further designed to produce error signals when incorrect parity is detected for groups of signals respectively received by said master device and said slave device; parity error circuitry connected to said first and second parity circuits and further connected to said addressable data signal storage means to respond to a parity error signal to provide said control signals to said latch register whereby said master device is able to receive, during a subsequent time, data signals from said latch register which had been the basis for a data signal transmission in a prior time.

6. In a data communication system, a circuit according to claim 5 wherein said addressable data signal storage means includes: an address decoder circuit to receive address signals; data register means to receive data signals for transmission to said latch register; and logic circuitry connected between said address decoder circuit and said data register means to provide control signals to said data register means partially in response to signals from said address decoder circuit.

7. In a data communications system, a circuit according to claim 6 wherein said logic circuitry is connected to said latch register means to provide said control signals thereto.

8. In a data communications system a circuit according to claim 6 wherein said parity error circuitry is connected to said logic circuitry.

9. In a data communications system, a circuit according to claim 5 wherein said parity error circuitry is formed to provide control signals in response to a parity error arising from a transmission of address signals and alternatively from a transmission of data signals.

* * * * *